United States Patent [19]

Spengler

[11] Patent Number: 4,508,499
[45] Date of Patent: Apr. 2, 1985

[54] SYSTEM FOR MANUFACTURING THREE-DIMENSIONAL WORK PIECES

[75] Inventor: Ernst M. Spengler, Heusenstamm by Ffm., Fed. Rep. of Germany

[73] Assignee: Stanztechnik GmbH R & S, Frankfurt, Fed. Rep. of Germany

[21] Appl. No.: 502,284

[22] Filed: Jun. 8, 1983

[51] Int. Cl.³ .............................................. B26F 1/44
[52] U.S. Cl. ..................... 425/88; 425/112; 425/126 R; 425/302.1; 425/527; 425/595
[58] Field of Search ............... 425/88, 112, 126, 527, 425/302.1, 595

[56] References Cited

U.S. PATENT DOCUMENTS

| | | | |
|---|---|---|---|
| 2,363,779 | 11/1944 | Duffy et al. | 144/281 |
| 3,027,596 | 4/1962 | Knowles | 425/302.1 |
| 3,703,572 | 11/1972 | Bellasalma | 425/112 |
| 3,869,234 | 3/1975 | Sutch | 425/112 |
| 3,994,763 | 11/1976 | Sheath et al. | 156/182 |
| 4,063,477 | 12/1977 | Hantke | 83/40 |
| 4,106,379 | 8/1978 | Spengler | 83/171 |
| 4,273,738 | 6/1981 | Spengler | 264/154 |
| 4,302,415 | 11/1981 | Lake | 425/302.1 |
| 4,308,005 | 12/1981 | Zundel | 425/302.1 |

Primary Examiner—John A. Parrish
Attorney, Agent, or Firm—W. G. Fasse; D. H. Kane, Jr.

[57] ABSTRACT

A system for manufacturing three-dimensional work pieces, such as interior automobile components, includes several cooperating stations arranged in such a way that a hingeable mold member connected to a hinging frame may cooperate with another mold member or with other tools such as trimming tools, curing tools, cleaning and waxing tools and the like. The hinging frame is engageable by hinging bolts of the same construction located in different work stations. The hingeable mold member is transportable, for example on an endless conveyor, when it is disengaged from the hinging bolts. The number of work pieces produced per unit of time is increased by the cooperation of a forming or shaping station with a trimming station, with a foaming station and several curing stations for the foamed material in a shaped work piece. A controlled sticking of the foaming material is used to facilitate the moving of a work piece from one station to another by a hinging movement of the respective mold, whereby the work piece is held in the mold by said controlled sticking even if the mold surface faces down.

19 Claims, 11 Drawing Figures

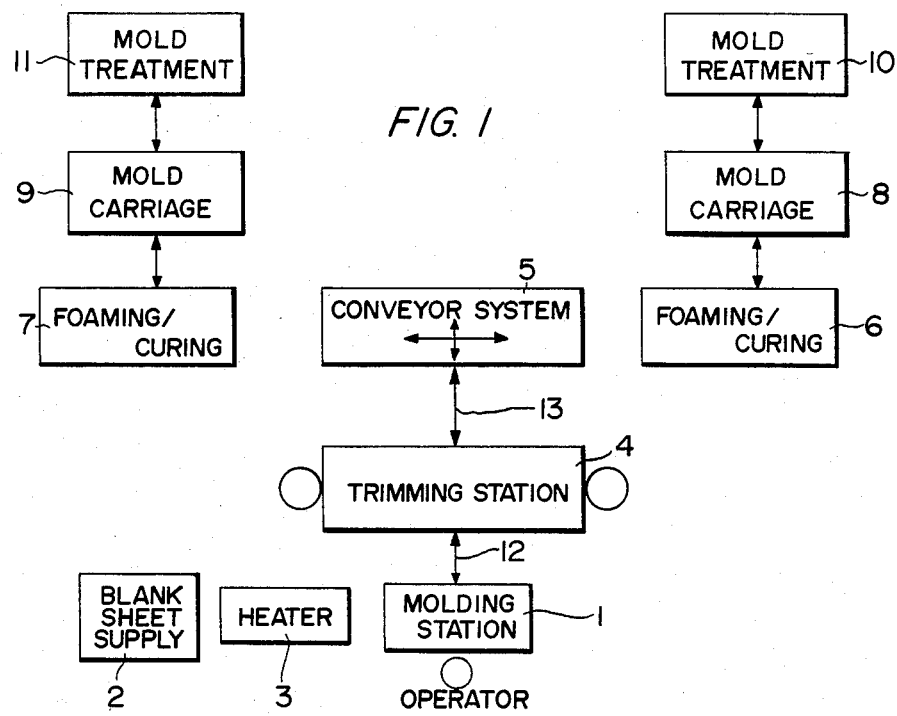
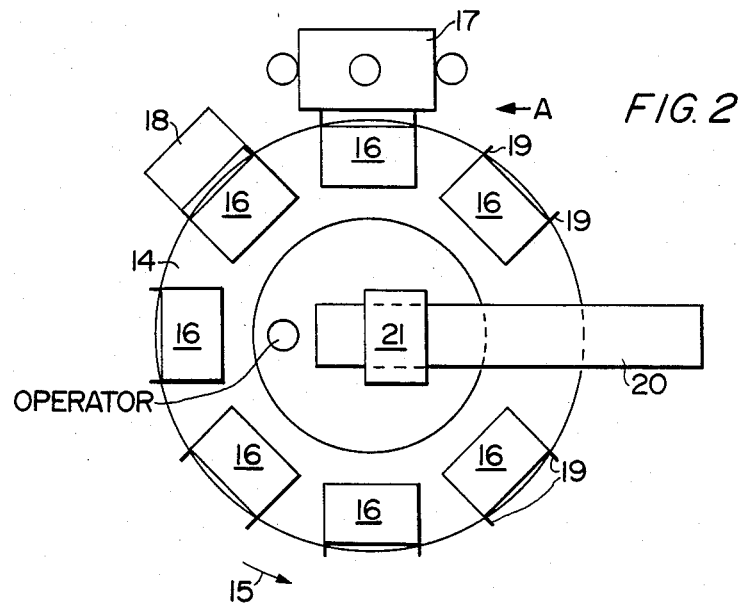

4,508,499

SYSTEM FOR MANUFACTURING THREE-DIMENSIONAL WORK PIECES

CROSS-REFERENCE TO RELATED APPLICATIONS

The present application relates to my copending application U.S. Ser. No. 260,418, filed on May 4, 1981, now U.S. Pat. No. 4,405,537 issued Sept. 20, 1983.

BACKGROUND OF THE INVENTION

The present invention relates to a system for manufacturing three-dimensional work pieces. Flat work pieces in this context are not considered to be three-dimensional work pieces even if they have a substantial thickness. An interior car component is a typical example of a three-dimensional work piece manufactured according to the invention.

In my U.S. Pat. No. 4,405,537 the primary and secondary molds are moved relative to each other substantially along straight paths, except in one embodiment where an upper secondary mold is hingeable into a position for cleaning the mold. However, all mold movements which involve the cooperation with other tools take place along straight paths. Such a system is quite satisfactory in most instances. However, my prior system leaves room for improvement with regard to the variability of the sequence of the particular work steps involved in the manufacturing of such three-dimensional work pieces.

U.S. Pat. No. 4,063,477 discloses an apparatus and method for cutting carpet in which a stationary lower support and a vertically movable upper support hold a pre-shaped carpet in position for the cutting operation. Vertically movable first cutting means travel through the lower and upper support which hold the carpet during the cutting. Second cutting means are positioned for cutting in directions extending at an angle to the vertical or horizontal direction. Such an apparatus is not suitable for the sequential shaping, foaming and trimming of the same work piece while the work piece is retained on the same upper or secondary mold member during all manufacturing steps.

My U.S. Pat. No. 4,106,379 discloses an apparatus for trimming three-dimensional work pieces resting on a lower support which cooperates with trimming tools, whereby the support may shuttle back and forth between a loading station and a trimming station.

U.S. Pat. No. 2,363,779 discloses a hose actuated press.

U.S. Pat. No. 3,994,763 discloses a molding apparatus with a hingeable cover for making sculptured plastic work pieces. The hingeable cover is permanently secured to the molding apparatus and hence not suitable for cooperation with other work stations.

U.S. Pat. No. 4,273,738 discloses a method and apparatus for forming and trimming three-dimensional work pieces in which upper and lower holding tools cooperate with shaping and cutting or trimming tools driven, for example, by piston cylinder drive means or by hose drive means. The cooperation of upper secondary mold members with several work stations is not disclosed in this earlier U.S. Patent.

OBJECTS OF THE INVENTION

In view of the above it is the aim of the invention to achieve the following objects singly or in combination:

to provide a manufacturing system for making three-dimensional work pieces which permits using any desired sequence of manufacturing steps, for example, shaping, foaming and trimming or shaping, trimming, foaming and further trimming, or where a pre-shaped or a pre-formed work piece is used to start with the trimming followed by foaming and possibly another trimming step;

to make it possible that the trimming knives pass through the work piece from the facing or "good" side to the back side to achieve cleaner cuts than in the prior art;

to keep a work piece on or in the same mold, especially a secondary mold, during several manufacturing steps to assure the dimensional stability and accuracy of the finished work piece;

to take advantage of the initial tendency of a foamed material to stick to a mold for transporting a work piece in or on the mold to a further processing station even if the work piece is held in the mold solely by sticking with the mold above the work piece at least during a portion of the transfer movement;

to assure a good bonding between one surface of a sheet of plastic material and a foaming material which subsequent to its curing provides the required rigidity of the finished three-dimensional work piece;

to control the sticking of the foamed material to the mold by coating the inner mold surface with a thin film, such as a wax film, which determines the stickiness to facilitate the removal of a work piece from a mold;

to facilitate the cleaning of a mold prior to further use of the mold; and to increase the output or number of work pieces completed per unit of time by the cooperation of a trimming station with several other stations, including curing stations for the foam material.

SUMMARY OF THE INVENTION

The system according to the invention for manufacturing three-dimensional work pieces comprises a plurality of work stations which are arranged to be movable relative to each other and which carry tool means. The term "tool means" includes primary mold members which are normally supported on a base and constitute lower molds. The tool means also include secondary mold members which constitute upper molds and are arranged for cooperation with other tool means in different work stations. The tool means further include work piece holding components, work piece cutting and trimming means and various drive means. The primary mold support means may be stationary or movable for cooperation with a work station which itself is stationary or movable. Secondary mold means are arranged for cooperation with the primary mold means and with tool means carried in the work stations. Hinging means are operatively arranged between a work station and the secondary mold means for engaging the secondary mold means when the latter are to be tilted into cooperation with the primary mold means or with the tool means. Tilting drive means are operatively connectable to the secondary mold means for tilting the secondary mold means from one position cooperating with the primary mold means into another position cooperating with said tool means carried by the work station and vice versa. A controlled sticking of the work piece to a secondary mold member is utilized to hold the work piece in the mold member even when the surface of the mold member faces downwardly at the beginning of a tilting movement.

BRIEF FIGURE DESCRIPTION

In order that the invention may be clearly understood, it will now be described, by way of example, with reference to the accompanying drawings, wherein:

FIG. 1 is a schematic top plan view of a first embodiment of the system according to the invention in which primary mold means cooperate with a number of tools, including secondary mold means which are movable into cooperation with the primary mold means or with other tools;

FIG. 2 is a schematic top plan view of a second embodiment of the system according to the invention including stationary work stations arranged close to a rotatable ring platform carrying a plurality of further work stations including primary and secondary mold means of which the secondary mold means are tiltable into cooperation with the stationary work stations;

FIG. 5a shows a detail of a locking bolt for securing tool means to a machine frame for introducing forces directly into the machine frame;

Figure 8:
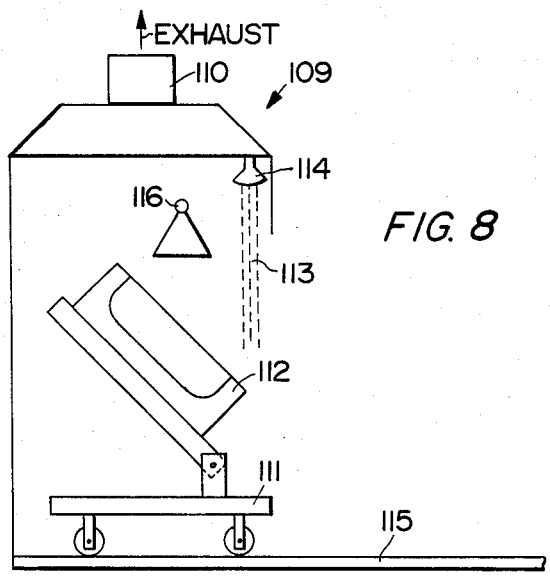
FIG. 8 shows a schematic side view of a tiltable mold member on a carriage and hinged into a mold treatment chamber.
Figure 9:
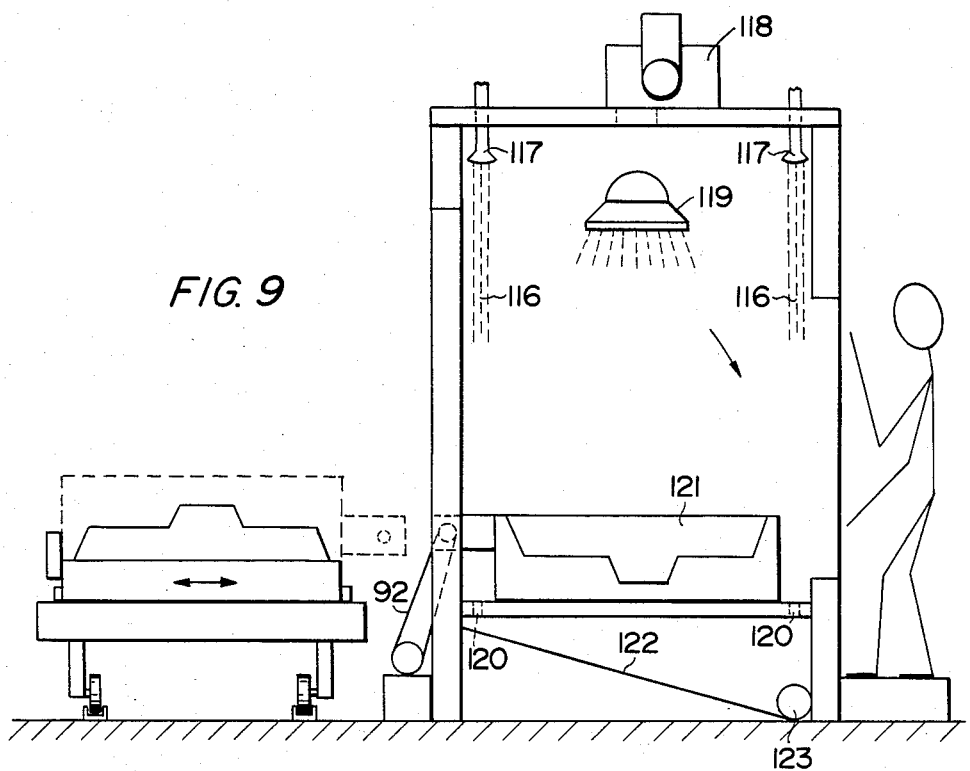
Figure 10:
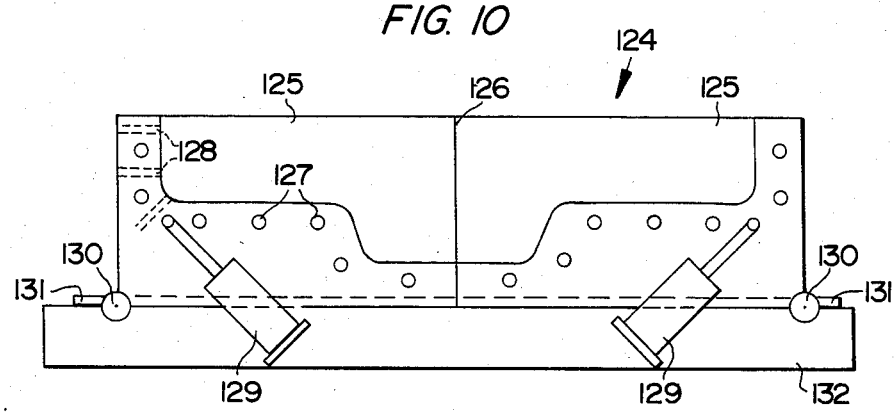

FIG. 9 is a view similar to that of FIG. 8, but showing a tiltable mold member tilted in its full line position into a mold treatment chamber; and FIG. 10 is a sectional view through a mold means in which a primary mold member has a number of primary mold components which are movable apart and together again by power drive means for facilitating the removal of a work piece from the primary mold member.

DETAILED DESCRIPTION OF PREFERRED EXAMPLE EMBODIMENTS AND OF THE BEST MODE OF THE INVENTION

The system of the invention shown in FIG. 1 comprises a first work station 1 which may be stationary or movable, for example by means of a carriage on rails carrying a primary mold, as will be described in more detail below. A blank sheet supply apparatus 2 feeds flat blanks of plastic sheet material through a heater 3 to the work station 1. The supply of sheets is not part of the invention and may take place manually or it may take place automatically as is disclosed in more detail in U.S. Pat. No. 4,405,537. The work station 1 cooperates with a further work station 4 such as a stationary stamping, cutting, or trimming apparatus. A conveyor system 5 is arranged next to the further work station 4 for transporting primary mold members either into a right-hand foaming and/or curing station 6 or into a left-hand foaming and/or curing station 7. These foaming and/or curing stations 6 and 7 hold a primary mold in place for cooperation with a hingeable or tiltable secondary mold mounted on carriages 8 and 9. Mold treatment chambers 10 and 11 are arranged for cooperation with the carriages 8 and 9 for treatment of the secondary mold members carried by these carriages 8 and 9. The molds are sprayed with a film to control sticking to these primary molds. For this purpose the molds are sprayed, for example with a wax film, as will be described in more detail with reference to FIGS. 8 and 9.

The system of FIG. 1 operates as follows. A flat sheet of plastics material is supplied by the supply apparatus 2 through the heater 3 onto the primary mold in the first work station 1 where the flat sheet is shaped into the three-dimensional form, for example, by applying suction through suction holes in the primary mold. When the shaping of the flat work piece into a three-dimensional form is completed the primary mold is shifted into the further work station 4, for example, on a roller conveyor symbolically indicated by the arrow 12. In the work station 4 a preliminary trimming takes place whereupon the primary mold is shifted again by a roller conveyor 13 onto the further conveyor 5 which brings the mold into the foaming and/or curing station 6. Here, the primary mold is closed by a secondary mold on the carriage 8 and the foaming and curing takes place. Thereafter, the mold is opened, whereupon the primary mold with the work piece still on the primary mold is moved back into the work station 1 where the finished work piece is removed by an operator.

In the meantime the secondary mold on the carriage 8 is treated in the chamber 10. For this purpose the secondary mold on the carriage 8 is tiltable as will be described below. While the foaming and curing takes place in the station 6, a further primary mold may be covered with a flat sheet blank and the just described steps are repeated relative to the left-hand portions 7, 9 and 11 of the system. In this manner it is possible to double the output capacity of finished work pieces per unit of time.

FIG. 2 shows another embodiment of the present invention in which a ring platform 14 is intermittently movable by conventional drive means in the direction of the arrow 15. The platform 14 carries a plurality of work stations 16, each comprising a primary mold and a secondary mold to be described in more detail below. A trimming station 17 and a mold treatment station 18 are arranged in stationary positions radially outwardly of the intermittently movable ring platform 14. Each secondary mold member in the stations 16 is provided with hinging or tilting arms 19 for tilting the secondary molds into the stations 17 and 18. A blank sheet supply conveyor 20 transports blank sheets through a heater 21 to an operator which places the sheets onto the primary mold members in the stations 16. The vacuum molding and foaming takes place in the first station 16 downstream of the mold treatment station 18 as viewed in the direction of the arrow 15. Once a blank is shaped and foamed it is cured in the stations 16 until the secondary mold is hinged or tilted into the trimming station 17 while still holding the work piece. In the station 17 the cutting or trimming operation takes place as the last operational step prior to removal of a finished work piece from the station 17 by an operator. Next, the secondary mold is tilted into the treatment station 18 for cleaning and coating with a film which will control the stickiness of the foamed material to the molding surface of the secondary molds in such a way that the work piece will be retained in the secondary mold for movement into the stamping or cutting station 17 without, however, interfering with the easy removal of a finished work piece from the station 17.

Figure 3:
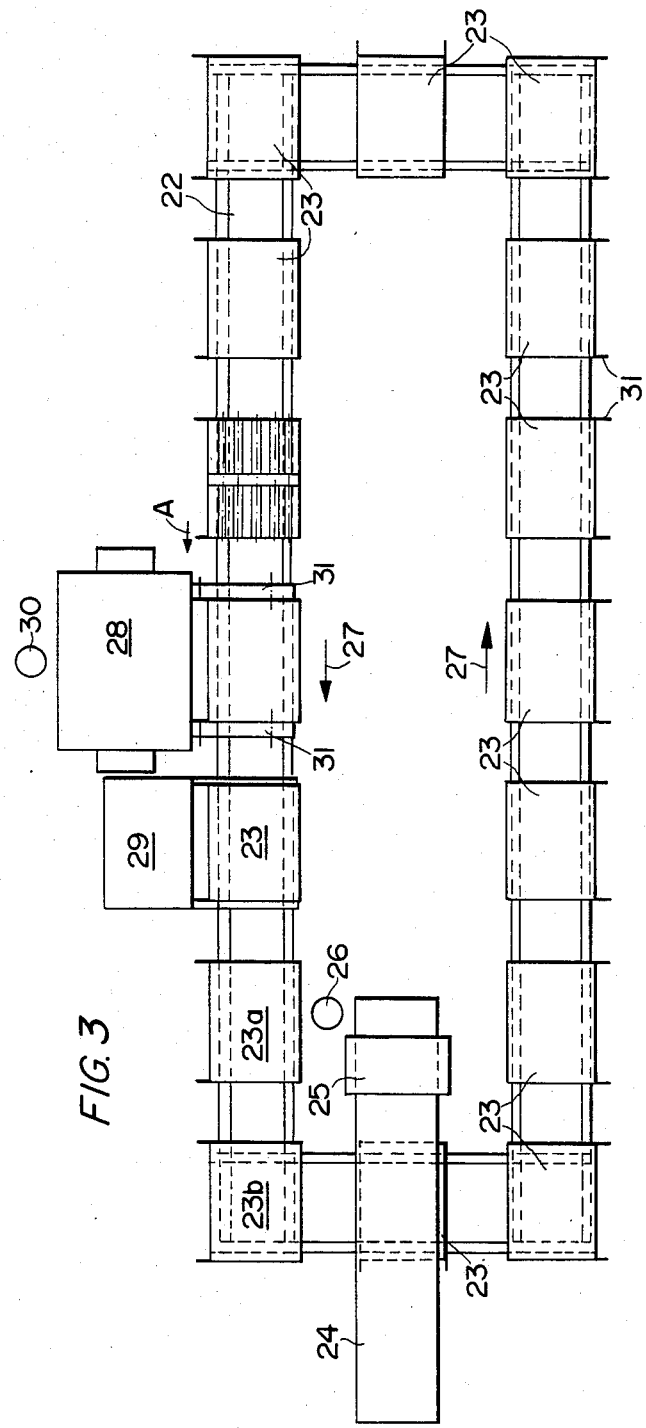
FIG. 3 is a schematic top plan view of a third embodiment of a system according to the invention similar to that of FIG. 2, except that the rotatable ring platform is replaced by an endless conveyor system carrying a plurality of further stations, each including primary and secondary mold means.

The embodiment of FIG. 3 comprises an intermittently movable endless horizontal conveyor 22 for carrying a plurality of primary and secondary mold means forming work stations 23 on said conveyor 22. A blank sheet supply conveyor 24 supplies flat sheets through a heater 25 to an operator 26 who places the sheets into a first work station 23a while the first work station is hinged into an open position. Each work station 23, 23a comprises a primary mold and a hingeable secondary mold, for example as shown in more detail in FIG. 5. The conveyor moves intermittently in the direction of the arrows 27 so that all stations come sequentially into cooperation with a cutting and trimming station 28 and then with a mold treatment station 29.

Once the operator 26 has placed a sheet onto the open mold means in the station 23a the shaping takes place by suction whereupon the mold is closed and moved into the next downstream station 23b where the foaming takes place. In all the following stations the foam has time to cure until it reaches a position opposite the cutting and trimming station 28 where the mold is tilted into the station 28. During this tilting the work piece sticks to the secondary mold and the secondary mold keeps holding the work piece during the trimming operation. After completion of the trimming an operator 30 removes the finished work piece from the station 28. Then the secondary mold is tilted back at least sufficiently to clear the station 28 for a subsequent tilting into the station 29 where it is treated, for example, with a wax coating to control the stickiness of the foam material to the inner surface of the secondary mold. As in FIG. 2, each secondary and primary mold is provided with hinging arms 31 for cooperation with the tilting means described below.

In connection with FIGS. 2 and 3 it will be appreciated, that the tilting direction could be reversed, whereby the stationary stations would be located inside the free space of the ring platform in FIG. 2 or of the endless conveyor in FIG. 3, and wherein the supply conveyors with the respective heaters would be located radially outside of the platform or conveyor.

Figure 4:
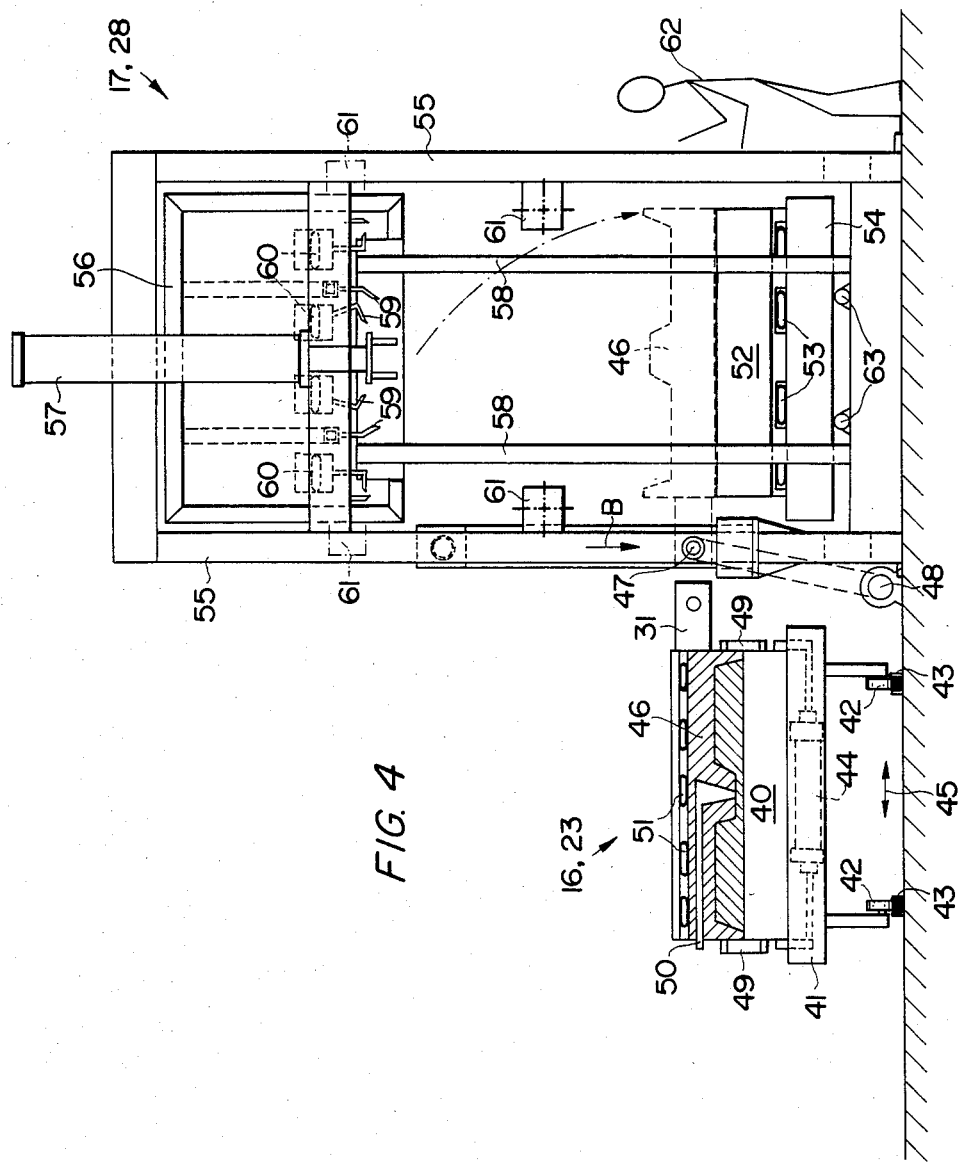
FIG. 4 is a side view substantially in the direction of the arrow A in FIGS. 2 and 3 showing a cutting or trimming work station located next to a stationary or movable primary molding station.

FIG. 4 shows, for example, the station 17 in FIG. 2 or the station 28 in FIG. 3 in more detail in cooperation with a work station 16 or 23. A primary mold member 40 forming a lower mold is supported on a carriage 41 riding on wheels 42 on tracks 43. The components 41, 42, 43 may form part of an intermittently rotatable platform or of an endless conveyor system, also intermittently movable. A piston cylinder means 44 is arranged to move the mold means horizontally back and forth in the direction of the arrow 45 so that the hinging arm 31 of a secondary mold member 46 forming an upper mold member in the full line position shown in FIG. 4, may be brought into cooperation with hinging means 47 and tilting drive means 48. In the dashed line position shown in FIG. 4 the secondary mold member 46 forms a lower member relative to a tool carrier 56.

When the primary lower mold member 40 and the secondary upper mold member 46 are in the fully closed position as shown in full lines in FIG. 4, a locking mechanism 49 becomes effective to lock the two mold members to each other for tightly closing a mold cavity into which a two component foaming material is introduced through inlet ducts 50. A mold closing force or pressure may be exerted by expandable hose elements 51 as is known as such. The hose elements 51 may extend perpendicularly to the plane of the drawing as shown, or they may extend in parallel to the plane of the drawing. As shown in FIG. 4, these hose elements 51 form part of the secondary mold member 46 and hence are tiltable into the dashed line position shown in FIG. 4 together with the secondary mold member 46.

The cutting, trimming or stamping operation takes place in the station 17 or 28. For this purpose the secondary mold member 46 is tilted into the station 17 or 28 in which the secondary mold member 46 is shown by dashed lines resting on a base 52 which may also be exposed to pressure by pressure expandable hose elements 53 or by the hose elements 51 extending perpendicularly or in parallel to the plane of the drawing. The base 52 may also be supported on a carriage 54. A machine frame 55 supports an exchangable tool carrier 56 movable up and down by pneumatic or hydraulic drive means 57 and guided along guide rails 58. The tool carrier 56 is equipped with a plurality of cutting elements such as strip steel knives 59 driven by individually operable pneumatic hose drive 60 as is described in more detail in the above mentioned U.S. Pat. No. 4,405,537. Work piece hold down means may be mounted on the tool carrier 56.

A power operated locking mechanism 61 cooperates with recesses in the tool carrier 56 to lock the tool carrier to the machine frame 55 for transmitting the cutting forces directly into the machine frame. FIG. 5a shows further details of such a locking mechanism. Further mechanisms 61 may be provided, if desired, for arresting the tool carrier 56 in its upper position. An operator 62 removes the finished work pieces from the secondary mold member 46 after the foaming, curing and trimming operations are completed. The base 52 with its carriage 54 may also be supported on roller conveyors 63 for moving the secondary mold member 46 into cooperation with other tool means as shown in FIG. 1.

Figure 5:
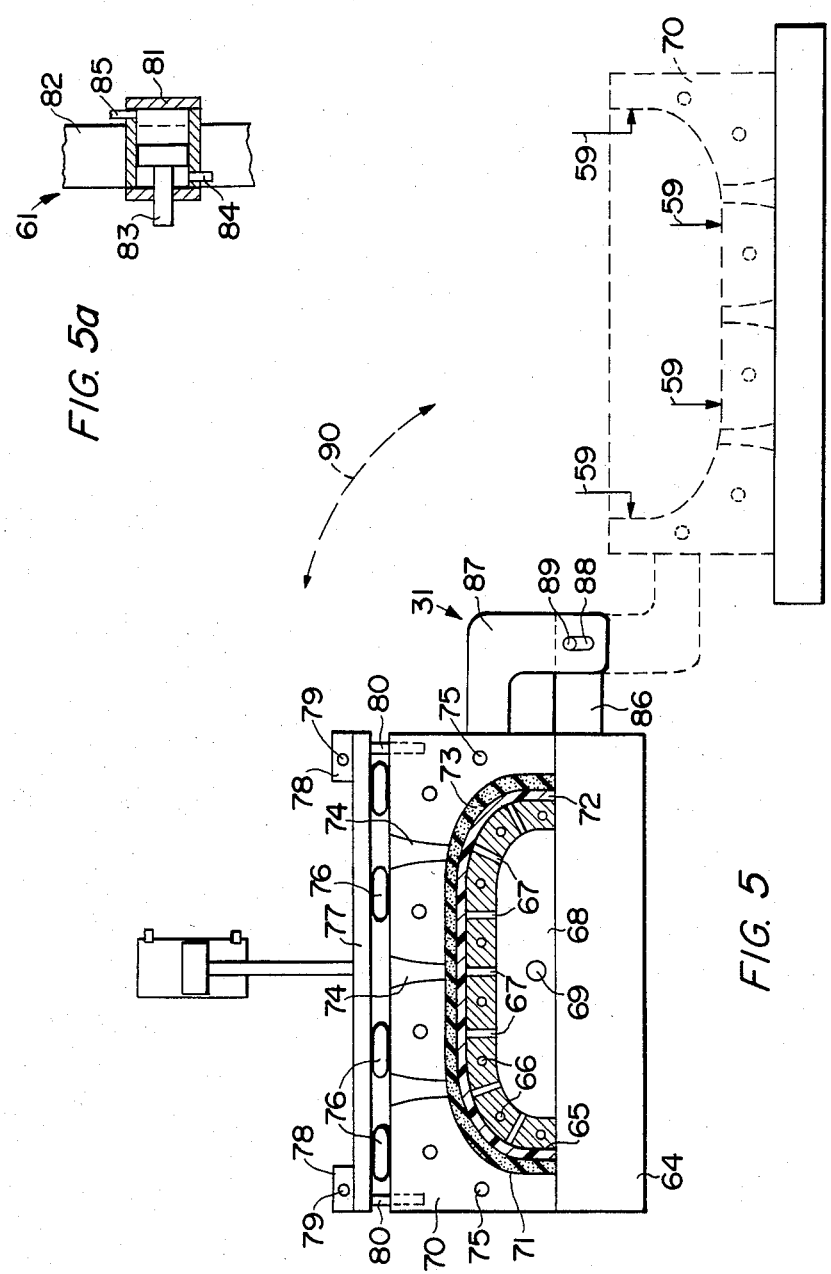
FIG. 5 shows a sectional view through a mold means including a primary mold member and a secondary mold member hingeably connectable to the primary mold member, whereby the secondary mold member is shown in full lines in the mold closed position and in dashed lines in its mold open position.

FIG. 5 shows a primary mold member 64 having a molding surface 65 which is cooled by a cooling medium such as water flowing through cooling ducts 66. Suction holes 67 connect the molding surface 65 to a reduced pressure cavity 68 connected to an exhaust port 69 which in turn is connected to a suction device not shown, but of conventional construction.

In FIG. 5 the mold means are shown in a closed position in which a secondary mold member 70 cooperates with the primary mold member 64 to form a molding cavity between the inner molding surface 71 of the secondary mold member 70 and the molding surface 65 of the primary mold member 64. A sheet of plastic material 72 has been shaped to closely hug the contour of the molding surface 65 by the application of suction through the holes 67. Thereafter, when the molds have been closed, a two component foam material 73 is supplied into the mold cavity through the filler ducts 74. The secondary mold member 70 is also cooled, for example, by flowing water through ducts 75. The mold cavity may be tightly closed by expandable hose elements 76 located between a reaction plate 77 and the secondary mold member 70. The reaction plate may be locked to the machine frame not shown by locking brackets 78 having locking holes 79. The reaction plate 77 is guided relative to the secondary mold 70 by guide pins 80. FIG. 5a shows a locking mechanism comprising a piston cylinder 81 secured to a machine frame member 82 and having a piston rod 83 adapted for engaging the locking holes 79 shown in FIG. 5. By applying pressure through the ports 84 or 85, the piston rod 83 may be withdrawn or inserted into the respective holes 79 as is conventional.

The tilting means 31 comprise a first support arm 86 and a second hinging arm 87. The support arm 86 is secured to the lower primary mold member 64. The second hinging arm 87 is secured to the secondary upper mold member 70. The arm 87 is provided with an elongated hinging hole 88 adapted to receive a hinging bolt 89 and simultaneously to permit the slight downward movement of the secondary mold member 70 toward the primary mold member 64 in response to an expansion of the hose element 76 which is expanded in FIG. 5.

Figure 6:
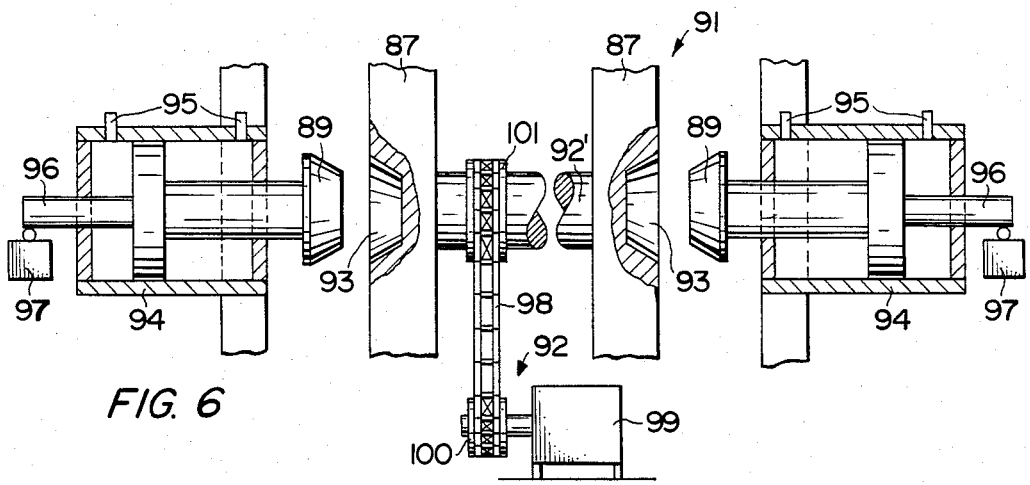
FIG. 6 is a sectional view through a hinging mechanism between a tiltable mold member and a machine frame substantially in the direction of the arrow B in FIG. 4.
Figure 7:
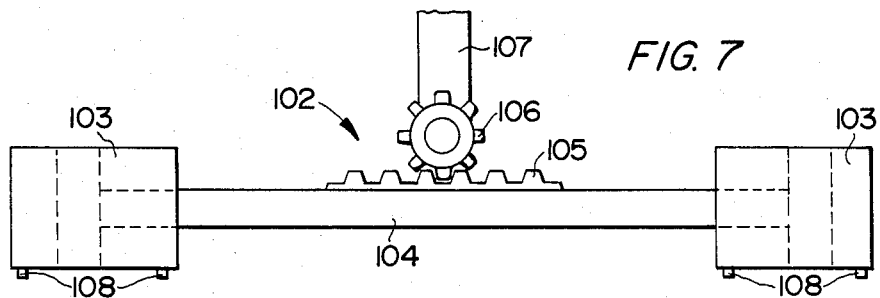
FIG. 7 is a simplified illustration of a drive for tilting a hingeable mold member.

FIG. 5 shows in the right hand portion thereof the secondary mold member 70 in the mold open position in dashed lines for cooperation with the strip steel knives 59 mentioned above with reference to FIG. 4. These strip steel knives are carried by the exchangeable tool carrier 56 and driven by pneumatic hose drives 60. The hinging of the secondary mold member 70 back and forth along the arcuate path 90 is accomplished with drive means as shown in FIGS. 6 or 7. The knives 59 cut the "good" surface first.

FIG. 6 shows a hinging mechanism 91 driven by a tilting mechanism 92. The hinging mechanism comprises the above mentioned hinging arms 87 corresponding to the hinging arms 31 shown, for example, in FIG. 3. The arms 87 are interconnected by a tilting shaft 92' and provided with hinging bolt receiving holes 93 which are shown to be conical. If the hinging holes 93 are elongated as shown at 88 in FIG. 5, only the end portions of the holes would have slanted, conical walls. It has been found, that engagement by the hinging bolts 89 in the hinging holes 93 permits the proper tilting of the secondary mold member through an angle of 180° even if the hole is slightly elongated. The hinging bolts 89 are automatically driven by piston cylinder devices 94 connectable to hose conduits at the respective ports 95. The piston cylinder devices 94 have sensor rods 96 cooperating with trip dog type switches 97 for the control of the position of the hinging bolts 89. These control mechanisms are known as such.

The tilting is accomplished by a chain drive 98 and a motor 99 of the tilting mechanism 92. The chain drive 98 comprises respective sprocket wheels 100 and 101 for transmitting the drive from the motor 99 onto the shaft 92'.

FIG. 7 shows another drive mechanism 102 for the tilting operation. Two piston cylinder devices 103 are interconnected by a piston rod 104 carrying a rack 105 cooperating with a pinion 106 operatively connected to a tilting arm 107 which in turn is connected to the respective secondary mold member. The piston cylinder devices 103 are controlled through inlet ports 108 as is conventional.

FIG. 8 shows a mold treatment chamber 109 having an exhaust fan 110 connected to the treatment chamber. A mold carriage 111 carries a secondary mold 112 into the treatment chamber, the open front side of which is screened off by a water curtain 113 produced by a spraying mechanism 114 connected to a conventional water supply. Drainage means below the treatment chamber are not shown, but conventional. The carriage 111 is movable on rails 115 into and out of the treatment chamber 109. Spray nozzles 116 are arranged inside the housing of the chamber for coating the inner surface of a mold with a film which facilitates the removal of a finished work piece from the mold and which also controls the stickiness of the foam material relative to the respective mold surface so that a sufficient bond is provided between the work piece and a mold so that the work piece will be retained in the mold when the mold is tilted into cooperation with other tool means as described above, yet permitting the easy work piece removal.

FIG. 9 illustrates another version of the treatment chamber. The structure is similar to the work station shown in FIG. 4. Two water curtains 116 are produced by respective spraying devices 117 for the protection of the operator and the environment. An exhaust fan 118 exhausts the fumes resulting from the spraying of the mold by a spraying nozzle 119 with a tackiness controlling film such as a wax film or an oil film. Drain holes 120 are provided in the base which supports the secondary mold 121 when the latter is tilted into the treatment chamber. A slanted floor 122 leads to a drain pipe 123. The secondary mold 121 may be tilted into the treatment chamber by the tilting mechanism 92 as described, or it may be moved into the treatment chamber on a carriage as described with reference to FIG. 8.

FIG. 10 shows a modification of a primary mold 124 having two mold components 125 separable from each other along a dividing plane 126. The mold components 125 are also provided with cooling ducts 127 and with suction holes 128, only a few of which are shown for simplicity's sake. Each mold component 125 is driven by a piston cylinder device 129 for either tilting or sliding the mold components apart, whereby the removal of a work piece from the primary mold is greatly facilitated to make sure that the work piece will stick to the secondary mold member for moving the work piece while it is being held by the secondary mold member into cooperation with other work stations as described. The mold components 125 may either be tilted about hinging members 130 or, if the latter are disengaged, the mold components may slide for a very short distance along guide rails 131 on a base 132.

Although the invention has been described with reference to specific example embodiments, it will be appreciated, that it is intended to cover all modifications and equivalents within the scope of the appended claims.

What is claimed is:

1. A system for manufacturing three-dimensional work pieces, comprising a number of work stations including tool means operatively carried by said work stations, primary mold means, primary mold support means arranged for cooperation with a work station for carrying said primary mold means, secondary mold means arranged for cooperation with said primary mold means and with said tool means carried by said work station, hinging means operatively arranged between said work station and said secondary mold means for engaging said secondary mold means when the secondary mold means are to be tilted from a first position in which said secondary mold means cooperate with said primary mold means into a second position in which said secondary mold means cooperate with said tool means and vice versa, and tilting drive means operatively connectable to said hinging means for tilting said secondary mold means from said first position for cooperating with said primary mold means into said second position for cooperating with said tool means carried by one of said work stations and vice versa.

2. The system of claim 1, wherein said work stations comprise base means for carrying said secondary mold means when the secondary mold means are tilted into a work station, said tool means comprising cutting tool means operatively mounted in said work station for cutting a work piece in a plurality of planes while a work piece is being held on a secondary mold means tilted into said work station, and cutting drive means operatively connected to said cutting tool means for moving the cutting tool means relative to a work piece in any direction of space, but so as to move a cutting tool first through the facing surface of a work piece.

3. The system of claim 2, wherein said cutting drive means comprise pneumatic hose drive means individually connected to its respective cutting tool means.

4. The system of claim 1, wherein said work station comprises a treatment chamber for said secondary mold means, and wherein said tool means comprise water spray means for establishing at least one water curtain in said treatment chamber, and means for spraying said secondary mold means in said treatment chamber with a film for controlling the subsequent adherence of a work piece to the surface of a secondary mold means.

5. The system of claim 4, wherein said means for spraying comprise spray nozzle means for coating the molding surface of a secondary mold means in said treatment chamber with a film of wax for facilitating the subsequent removal of a foamed work piece from said secondary mold means.

6. The system of claim 1, wherein said primary mold support means for carrying said primary mold means comprise a movable carriage for moving said primary mold means into a fixed positional relationship alongside one of said work stations.

7. The system of claim 1, wherein said primary mold support means for carrying said primary mold means comprise intermittently rotatable ring platform means, said primary mold means comprising a plurality of individual primary mold members supported on said ring platform means, and wherein said secondary mold means comprise a plurality of individual secondary mold members arranged for cooperation with the respective one of said primary mold members for holding a work piece on or in the same mold means during all manufacturing steps such as shaping, foaming, foam curing and trimming.

8. The system of claim 7, further comprising sheet supply conveyor means arranged for supplying flat sheets of plastic material to a position relative to said ring platform means and to at least one of said plurality of primary mold members forming a work piece shaping station on said ring platform means, said conveyor means reaching substantially toward said shaping station, said work stations further comprising a foaming station and a plurality of foam curing stations arranged sequentially on said ring platform means, and a trimming station and a mold treatment station arranged in stationary positions radially relative to said ring platform means in such positions that secondary mold members are tiltable into said trimming station and into said mold treatment station by said tilting drive means during stoppage of the intermittently rotatable ring platform means.

9. The system of claim 1, wherein said primary mold support means for carrying said primary mold means comprise intermittently movable endless horizontal conveyor means, said primary mold means comprising a plurality of individual primary mold members supported on said endless conveyor means, and wherein said secondary mold means comprise a plurality of individual secondary mold members arranged for cooperation with the respective primary mold member for holding a work piece on or in the same mold means during all manufacturing steps such as shaping, foaming, foam curing and trimming.

10. The system of claim 9, further comprising sheet supply means arranged for supplying flat sheets of plastic material into a position relative to said horizontal endless conveyor means and to at least one of said plurality of primary mold members forming a work piece shaping station, said sheet supply means reaching substantially toward said work piece shaping station, said work stations comprising a foaming station and a plurality of foam curing stations arranged sequentially on said endless conveyor means, and a trimming station and a mold treatment station arranged relative to said horizontal endless conveyor means in such positions that secondary mold members are tiltable into said trimming station and into said mold treatment station by said tilting drive means during stoppage of the intermittently movable horizontal conveyor means.

11. The system of claim 1, wherein said primary mold means comprise suction holes connectable to a source of reduced pressure for shaping a flat sheet material into the desired shape of a three-dimensional work piece, said primary mold means further comprising cooling ducts for flowing a cooling medium through said primary mold means, and wherein said secondary mold means comprise foaming material inlet means for introducing foaming material into a mold cavity formed between two complementary primary and secondary mold means, and wherein said secondary mold means comprise further duct means for flowing a cooling medium through said secondary mold means.

12. The system of claim 1, wherein said hinging means comprise a pair of hinging bolts, axially aligned hinge holes in said secondary mold means adapted for receiving a respective one of said hinging bolts, and power driven actuating means operatively connected to said hinging bolts for inserting and withdrawing the hinging bolts from the respective hinge hole.

13. The system of claim 12, wherein said hinge holes have a female conical shape and wherein said hinging bolts have a male conical shape for slidingly fitting into said respective hinge holes.

14. The system of claim 1, wherein said tilting drive means comprise two cylinders, a piston in each cylinder, a piston rod operatively connecting said pistons for back and forth movement, rack and pinion means arranged to be driven in one or the other direction by the movement of said piston rod, and means operatively connecting said pinion means to said secondary mold means for tilting the secondary mold means back and forth between two positions.

15. The system of claim 1, wherein said tilting drive means comprise reversible chain drive means operatively connectable to said secondary mold means for tilting the secondary mold means back and forth between two positions.

16. The system of claim 1, wherein said primary mold means have first support arm means and said secondary mold means have second hinge arm means reaching into cooperation with said first support arm means, axially aligned hinge holes in said first and second arm means, and wherein said hinging means comprise axially movable hinging bolt means movable into the respective hinge holes in a pair of arm means including one support arm of the primary mold means and another hinge arm of the secondary mold means for tilting the secondary mold means between said first and second positions.

17. The system of claim 16, further comprising pressure application means operatively arranged for moving said primary mold means and said secondary mold means toward each other to tightly close a molding cavity formed by said primary and secondary mold means, said axially aligned hinge holes including one elongated hinge hole in each pair of hinge holes for permitting a molding cavity closing movement even if the respective hinging bolt means engage the pairs of hinge holes.

18. The system of claim 1, wherein said primary mold means comprise at least two mold forming components and power drive means for moving said mold forming components toward and away from each other.

19. The system of claim 1, wherein said secondary mold means (46) comprise expandable hose means (51) which are tiltable back and forth together with the secondary mold means between said first and second position.

* * * * *